US008385221B2

(12) United States Patent
Chetlur et al.

(10) Patent No.: US 8,385,221 B2
(45) Date of Patent: Feb. 26, 2013

(54) SYSTEM AND METHOD FOR MONITORING OF USER QUALITY-OF-EXPERIENCE ON A WIRELESS NETWORK

(75) Inventors: Malolan Chetlur, Karnataka (IN); Partha Dutta, Bangalore (IN); Shivkumar Kalyanaraman, Bangalore (IN); Arun Vishwanath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 12/714,524

(22) Filed: Feb. 28, 2010

(65) Prior Publication Data

US 2011/0211464 A1    Sep. 1, 2011

(51) Int. Cl.
*H04L 12/26* (2006.01)
*H04W 4/00* (2009.01)
(52) U.S. Cl. .................................. 370/252; 370/328
(58) Field of Classification Search .................. None
See application file for complete search history.

(56) References Cited

U.S. PATENT DOCUMENTS

| | | | |
|---|---|---|---|
| 2007/0230413 A1* | 10/2007 | Gandhi et al. | 370/338 |
| 2007/0242702 A1* | 10/2007 | Shim | 370/516 |
| 2008/0159233 A1 | 7/2008 | Achtari et al. | |

FOREIGN PATENT DOCUMENTS

CN    1763843    4/2006

OTHER PUBLICATIONS

PCT International Search Report, International Searching Authority/European Patent Office, Jun. 20, 2011, 4 pages.
Talwalkar, Rohit et al., "Analysis of Quality of Service (QoS) in WiMAX Networks", Networks, 2008, ICON 2008, 16th IEEE International Conference on, IEEE, Piscataway, NJ, USA, 2008, pp. 1-8, XP031417457, ISBN: 978-1-4244-3805-1.
Wimax Forum, "WiMAx Forum Network Architecture", Informative Annex, DOI: WMF-T32-004-R015v01, Nov. 21, 2009, pp. 1-24.

* cited by examiner

*Primary Examiner* — Clemence Han
(74) *Attorney, Agent, or Firm* — Ference & Associates LLC (57) ABSTRACT

Embodiments of the invention provide monitoring of the Quality-of-Experience (QoE) of a mobile user of a wireless network without introducing any additional packets or requiring user feedback. Furthermore, embodiments of the invention provide QoE information based on certain control messages that may be utilized for reporting, research, or monitoring purposes. As such, a service provider could utilize the QoE information provided by embodiments of the invention to, among other possibilities, manage, upgrade, or enhance their wireless network to ensure a quality network experience for end users.

19 Claims, 5 Drawing Sheets

SYSTEM AND METHOD FOR MONITORING OF USER QUALITY-OF-EXPERIENCE ON A WIRELESS NETWORK

BACKGROUND

The subject matter described herein generally relates to the monitoring of the Quality-of-Experience (QoE) of a mobile user of a wireless network without introducing any additional packets or requiring user feedback.

Wireless networks are expanding their offerings of live or near-live multimedia services, including mobile video calls, voice and/or video conferencing, video streaming, mobile informational devices (for example, mobile telemedicine video carts), and service appliances. In addition, the availability of fourth generation wireless networks (4G), which enable high bandwidth and latency sensitive applications over wireless, is increasing. Quality-of-Service (QoS) parameters, such as packet delay, loss, and jitter, provided by the underlying network to the service flow varies with time. In addition, the QoE is sensitive to even small changes in the QoS parameter values. As such, in order to provide satisfactory multimedia service, it is important to continuously monitor the QoE perceived by the mobile user.

Existing QoE metrics for multimedia services can be categorized in multiple ways. For example, QoE metrics for multimedia services can be categorized according to service type, such as whether the application is utilizing voice (mean opinion scores [MoS]) or video (peak signal-to-noise ratio PSNR). QoE metrics can be categorized subjectively through evaluation by actual users of a particular service (MoS) or through objective quality metrics, such as analytical models like PSNR. QoE metrics for can be categorized based on how much reference information is required about the original (reference) multi-media flow (for example, full-reference, reduced-reference and no-reference). QoE metrics for can be categorized based on whether spatial or temporal distortions (initial buffering time, stalls) are measured, whether user feedback is required, and/or whether probes (QoE robots) or new messages are utilized. QoE metrics for can be categorized based on location of the QoE module (at the source, end-user or in the network), and whether live QoE monitoring or offline QoE computation is employed.

The monitoring and management of Quality-of-Experience (QoE) is important to high-level wireless communication networks, such as the fourth generation wireless network (4G). This is due to such networks volume intensive rich media services, scarce wireless resources, the pack value per wireless bit, and prioritizing among sessions to increase value per wireless bit. Wireless communication networks, such as 4G networks, are higher bandwidth compared to 3G networks, due primarily to the ability to provide, among other services, rich media services, data downloads, and multiple sessions simultaneously. As such, bottlenecks will occur between network base stations and end users devices. Thus, there is a need for specific intervention to manage such services, as the challenge to the wireless link becomes the bottleneck created by supporting all of a network's mobile users.

In existing systems, wireless links have a fixed number of transmission slots. In addition, wireless conditions can vary depending on, among other conditions, geographic area, number of users, and data load. Furthermore, services delivered on wireless links, such as media services, may not be provided at a constant rate and network base stations may not have the same data and connection capabilities. Thus, a need exists for an intelligent mechanism to manage and alleviate any such network bottlenecks.

Existing solutions for remote monitoring of QoE of a mobile user either modify existing messages or introduce new packets or messages, while other existing solutions are application specific. In addition, such solutions are not easy to deploy and are not scalable when continuous monitoring of QoE of a large number of mobile users is required. Furthermore, certain existing solutions are based on non-standard protocols and, as such, are unable to support diverse end-user equipment and applications.

BRIEF SUMMARY

Embodiments of the invention broadly contemplate systems, methods, apparatuses and program products for monitoring the QoE of a mobile user of a wireless network. In addition, embodiments of the invention provide for the monitoring of wireless network packets using, among other control messages, the Minimum Reserved Traffic Rate (MRTR), the Downlink Physical Service Level, and the Available Radio Resource in Downlink control messages. Furthermore, embodiments of the invention provide remote monitoring and estimation of basic parameters as delay or bandwidth, which may also be used to measure QoE. Thus, embodiments of the invention provide QoE information based on certain control messages that may be utilized for reporting, research, or monitoring purposes. As such, a service provider could utilize the QoE information provided by embodiments of the invention to, among other possibilities, manage, upgrade, or enhance their wireless network to ensure a quality network experience for end users.

In summary, one aspect of the invention provides a method, comprising: ascertaining at one or more monitors one or more wireless network characteristics selected from the group consisting of: control messages of a wireless network; one or more base station delay factors; packet information from one or more packets transmitted over the wireless network; and packet statistics; and calculating quality of experience metrics at the one or more monitors using the one or more wireless network characteristics.

A system comprising: one or more processors; and a computer readable storage medium having computer readable program code embodied therewith, the computer readable program code being executable by the processor and comprising: computer readable program code configured to ascertain one or more wireless network characteristics selected from the group consisting of: control messages of a wireless network; one or more base station delay factors; packet information from one or more packets transmitted over the wireless network; and packet statistics; and computer readable program code configured to calculate quality of experience metrics using the one or more wireless network characteristics.

A computer program product comprising: a computer readable storage medium having computer readable program code embodied therewith, the computer readable program code comprising: computer readable program code configured to ascertain one or more wireless network characteristics selected from the group consisting of: control messages of a wireless network; one or more base station delay factors; packet information from one or more packets transmitted over the wireless network; and packet statistics; and computer readable program code configured to calculate quality of experience metrics using the one or more wireless network characteristics.

For a better understanding of exemplary embodiments of the invention, together with other and further features and advantages thereof, reference is made to the following

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment", "an embodiment", "an aspect" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

Embodiments of the invention broadly contemplate systems, methods, apparatuses and program products providing remote monitoring of QoE of a wireless network mobile user. In addition, embodiments of the invention are located in the wired part of the access network, and hence, are able to remotely monitor a mobile user. Furthermore, embodiments of the invention do not require feedback from the mobile user, modification to the mobile user's device, and do not modify existing or introduce new data or control packets. Moreover, embodiments of the invention provide QoE metrics that may be monitored and an estimated delay can be used to measure a mobile user's experience, such as measuring the number and duration of stalls, or lost packets and frames. This allows, among other features, the management of QoE with varying channel conditions, network load, video stream bit rate, and number of network base stations. In addition, the subject matter described herein provides for the management of QoE for traveling mobile users, premium video subscriptions, and HD quality video streaming (for example, in partnership with a 4G provider). Furthermore, other advantages include QoE monitoring that is scalable and deployable across various network architectures and without additional requirements of end-user devices. Moreover, as a non-limiting example, a telecommunications company could benefit from the subject matter described herein by monitoring the QoE information to better manage its wireless services and to enhance its premium enterprise and consumer mobile services. It should be noted that while exemplary embodiments of the invention are described in detail herein with reference to "downlink" monitoring, those having ordinary skill in the art will recognized that modifications could be made to implement one or more embodiments for "uplink" monitoring as well.

A typical Worldwide Interoperability for Microwave Access (WiMAX) wireless communications network will serve as a non-limiting example to highlight certain aspects of the invention. Live or near-live multimedia services, including voice/video calls and conferencing, and video streaming, are being deployed on WiMAX networks. As the wireless communication channels are inherently time-varying in nature, the Quality of Service (QoS) parameters, such as packet delay, loss, and jitter, provided by an underlying network to the service flow varies with time. However, the end-user QoE is sensitive to even small changes in the values of the QoS parameters. Thus, to provide a satisfactory multimedia service, it is important to continuously monitor the QoE perceived by the mobile user. As such, embodiments of the invention provide monitoring of QoE of a WiMAX mobile user of a Real-Time Transport Protocol (RTP) based multimedia service.

Existing solutions for remote monitoring of QoE of a mobile user either modify or introduce new packets or messages through, for example, feedback messages from an application layer user agent. Such solutions are not easy to deploy or scalable when continuous monitoring of QoE for a large number of mobile users is required. Thus, embodiments of the invention do not require modification of existing or introduction of any data or control packets. In addition, embodiments of the invention are standard based (for example, WiMAX and RTP). As such, they can support diverse network architecture as well as diverse user devices and applications.

Embodiments of the invention monitor the QoE of a WiMAX mobile user of a multimedia service by monitoring the RTP packets in the wired part of the access network, and estimating the receiver packet trace. Aspects of the invention also provide that the remote monitoring system is co-located with the WiMAX Access Service Network Gateway (ASN GW).

In a WiMAX network, the air interface with a mobile station is defined in the IEEE 802.16 specification. In the most commonly used mode, Point-to-Multipoint (PMP), the network is divided into cells (or further divided into sectors). In each cell or sector, multiple mobile stations (MS) are served by a base station (BS) over the IEEE 802.16 based air interface. By way of non-limiting examples, MSs may be, among other devices, a cell phone, laptop, or desktop. Beyond the BS, the network reference model developed by the WiMAX Forum Network Working Group (NWG) provides an end-to-end network architecture for WiMAX network deployment using the IEEE 802.16 as the air interface. Embodiments of the invention utilize the real-time scheduling services (for example, Unsolicited Grant Service [UGS], real-time Polling Service [rtPS], and extended real-time Polling Service [ertPS]) in the 802.16 MAC.

In this network architecture, one or more BSs are connected to the service provider's core network through an access gateway, called the Access Service Network Gateway (ASN GW). All of the data packets sent from outside the access network go through the data plane of the ASN GW. In the control plane, the ASN GW exchanges NWG control message with connected BSs for various control functions. Embodiments of the invention can utilize, among others, two function types of NWG control messages: Radio Resource Management (RRM) and Data Path Control (DPC). RRM messages are used to monitor the wireless channel between a BS and the MSs connected to the BS. The DPC messages are used to create and delete data paths (for example, one for each multimedia service flow) and to modify associated parameters (for example, QoS parameters such as rate, delay and jitter at BS).

Certain embodiments of the invention provide that a packet format specified by RTP is used in the transport layer for the media flow. RTP is widely used for packet format for audio and video delivery over Internet and other IP networks. In addition, embodiments of the invention record the size of the RTP packet and utilize two header fields in the RTP packet specification: the timestamp and the sequence number fields.

According to embodiments of the invention, the estimation of the receiver packet trace for a given service flow is generated from the estimate of the reception time at the MS for each RTP packet. In addition, the reception time of an RTP packet is estimated by recording its departure time at the monitoring system (co-located with ASN GW) and its size, and tracking the variable downlink (DL) rate obtained by the service flow on the wireless link. Furthermore, the DL rate is tracked using the WiMAX Forum Network Working Group (NWG) control messages that are exchanged between the ASN GW and the BS to which the MS is connected. The delay suffered by a packet from ASN GW to MS is primarily dependent on queuing and transmission delay at the BS. As such, embodiments of the invention compute these delays for each packet, and using that estimate compute the reception time of the packet at the MS. This reception time is used to generate the receiver packet trace and different QoE metrics.

The description now turns to the figures. The illustrated embodiments of the invention may be understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
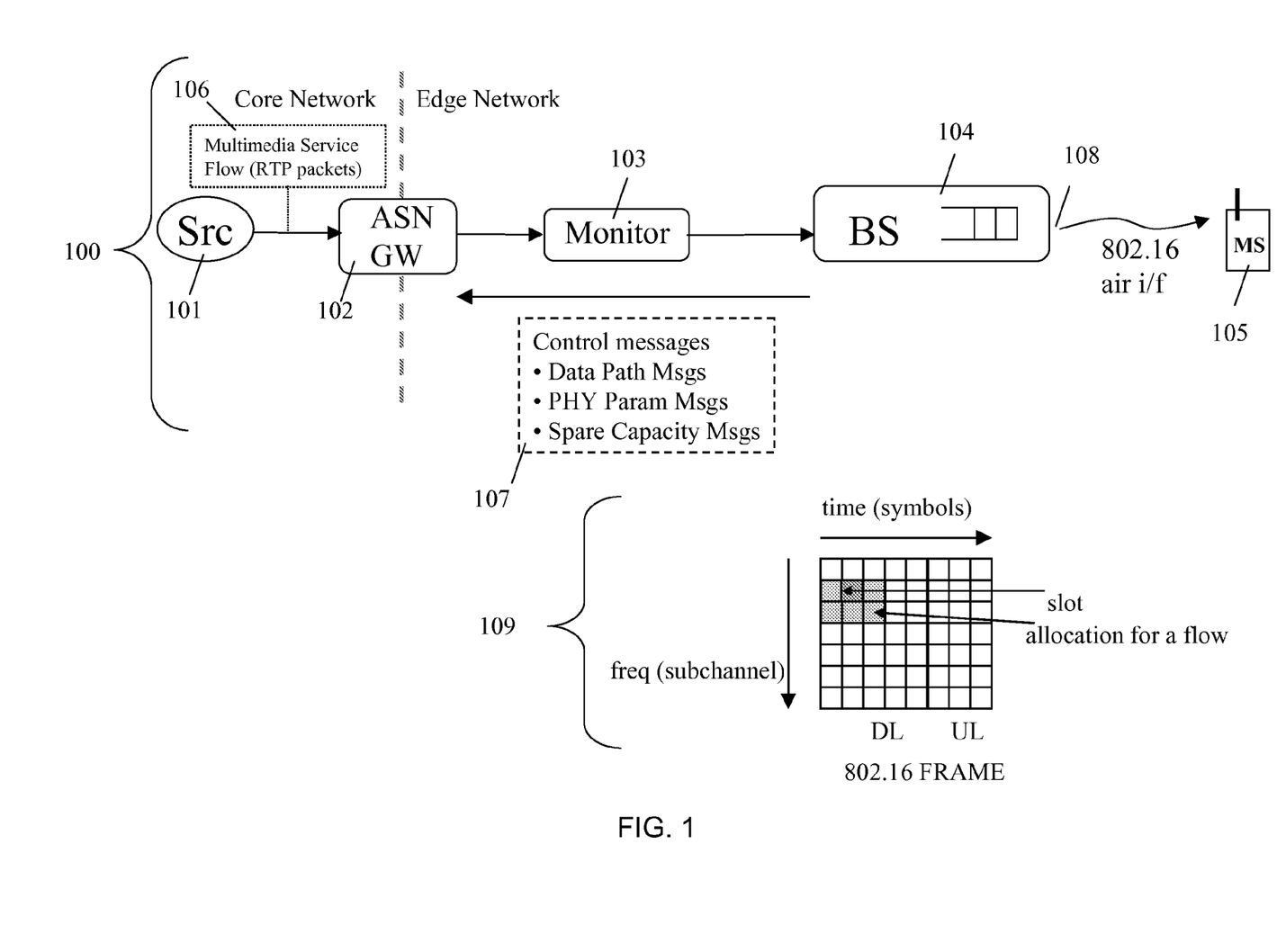
FIG. 1 illustrates an exemplary wireless communications network according to an embodiment of the invention.

Referring now to FIG. 1, there is depicted a diagram of an exemplary a wireless communications network 100 utilizing a remote QoE monitor 102 according to an embodiment of the invention. As is apparent from the description, however, the embodiments of the invention may be implemented in any appropriate configuration, as described herein.

As shown in FIG. 1, a source (SRC) 101 sends service flow packets 106, such as multimedia data, to the mobile station 105. In the WiMAX setup or standard, used herein as a non-limiting example, there is an Access Service Network Gateway (ASN GW) 102, which serves as a gateway to, by way of non-limiting example, the Internet or the rest of a telecom network. Embodiments of the invention provide that the monitor 103 may be co-located with the ASN GW 102, or the monitor may be a standalone computer that lies between the ASN GW 102 and the base station (BS) 104. The MS 105 is communicatively connected to the BS 104. In certain embodiments of the invention, the BS 104 follows the 802.16 physical and MAC standard for WiMAX. Aspects of the invention provide that the monitor 103 is transparent to the other network components.

The RTP packets 106 contain the multimedia data flowing from the SRC 101 to the MS 104. In addition, there are various control messages 107 that are exchanged between the BS 104 and the ASN GW 102 to maintain the wireless channel between the BS 104 and the MS 105. According to embodiments of the invention, contemplated QoS control messages 107 include data path messages, physical parameter messages, and spare capacity messages. Embodiments of the invention may utilize the Minimum Reserved Traffic Rate (MRTR) data path message, which is the negotiated average traffic rate for a service flow. In addition, embodiments of the invention may utilize the Downlink Physical Service Level (PSL) physical parameter message, which indicates the number of bytes that can be packed in a slot for a particular MS 105 and is dependent upon the radio channel quality of the MS 105. Furthermore, embodiments of the invention may utilize the Available Radio Resource in Downlink (ARRD) spare capacity message, which indicates the fraction of free slots in a downlink.

RTP packets 106 that are coming to the BS 104 as part of the data flow are queued at the BS 104 depending on the QoS parameters, and are then scheduled on the wireless link 108 and sent to the MS. The BS 104 sends the data in frames 109 and part of the frame 109 is dedicated to each wireless connection. The smallest unit in a frame 109 is a slot. For each data flow 106 of the wireless connection between the BS 104 and the MS 105, various QoS parameters are maintained, such as average traffic rate. The QoS parameters are negotiated between the BS 104 and the ASN GW 102 using the data path messages.

Figure 2:
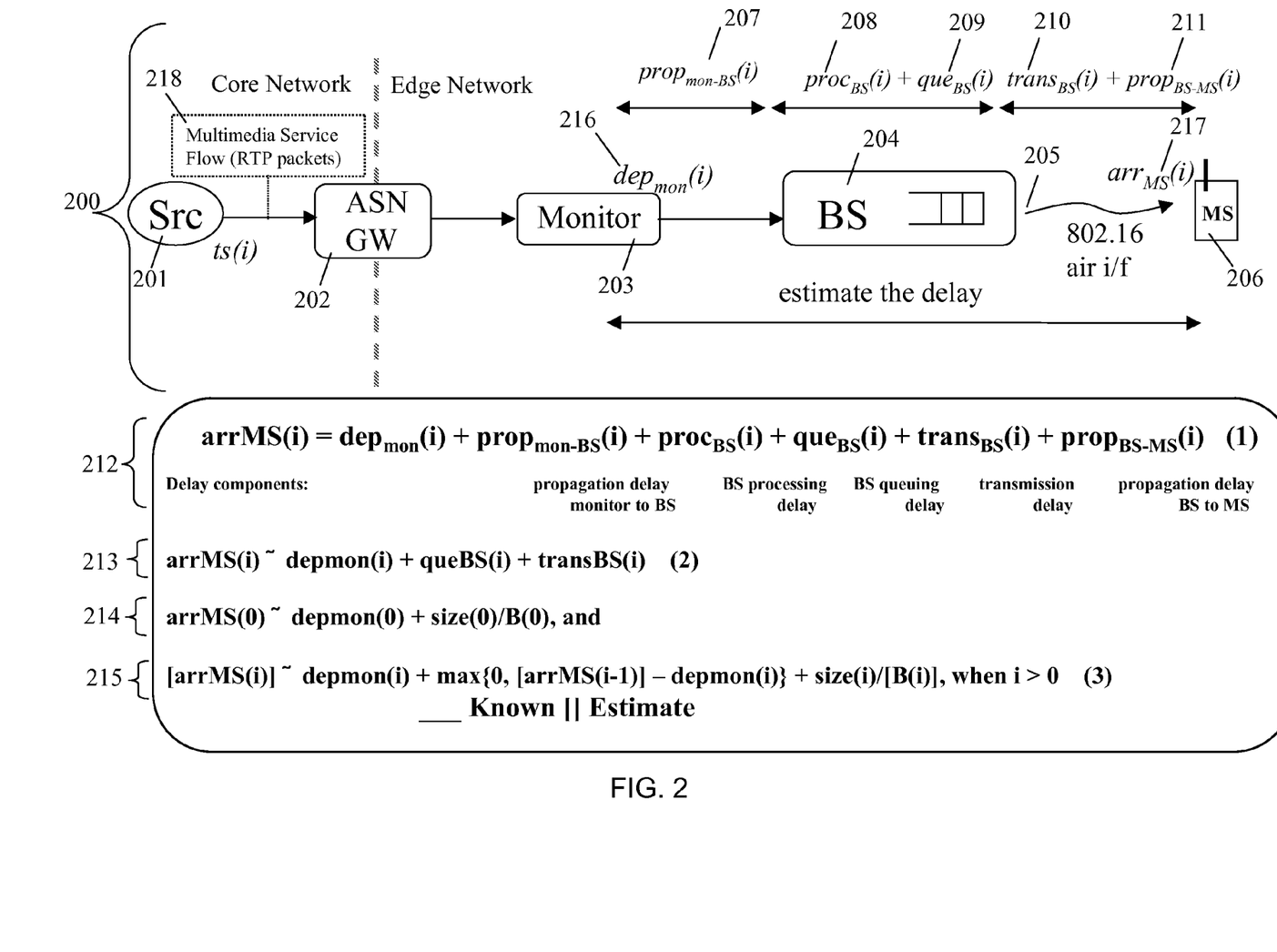
FIG. 2 illustrates another exemplary wireless communications network according to an embodiment of the invention.

Referring now to FIG. 2, there is depicted another diagram of an exemplary wireless communications network 200 utilizing a remote QoE monitor 202 according to an embodiment of the invention. FIG. 2 further demonstrates QoE monitoring aspects of embodiments of the invention.

FIG. 2 demonstrates embodiments of the invention wherein the timestamp of incoming RTP packets 218 and their departure time 216 are recorded at the monitor. In addition, the delay from the monitor to the MS 206 and the arrival time 217 at the MS 206 for each packet is estimated. Furthermore, the framework depicted in FIG. 2 provides for the calculation of QoE metrics according to embodiments of the invention, such as distribution of media stalls, delayed packets and/or frames, based on the estimated arrival time of packets at the MS 206.

Embodiments of the invention provide that certain fields of each RTP packet are recorded at the monitor 203. According to embodiments of the invention, the departure time, the time when the transmission of the $i^{th}$ packet is complete at the monitor 203, of the $i^{th}$ packet from the monitor 203 is $\text{dep}_{mon}(i)$ 216, and its size is size(i). In addition, the sequence number for the first RTP packet in the flow may be selected randomly. As such, the sequence number of the $i^{th}$ packet in the flow is (i+sequence number of the first packet). The delay experienced by packet i from the monitor 203 to the MS 206 consists of: (1) the propagation delay from the monitor 203 to the BS 204 $\text{prop}_{mon\text{-}BS}(i)$ 207; (2) the processing time at the BS 204 $\text{proc}_{BS}(i)$ 208; (3) the queuing time at the BS 204 $\text{que}_{BS}(i)$ 209; (4) the transmission time at the BS 204 $\text{trans}_{BS}(i)$ 210; (5) and the propagation time from the BS 204 to the MS 206 $\text{prop}_{BS\text{-}MS}(i)$ 211. Thus, the arrival time $\text{arr}_{MS}(i)$ 217 of packet of a flow at the MS 206 is estimated by:

$$\text{arr}_{MS}(i) = \text{dep}_{mon}(i) + \text{prop}_{mon\text{-}BS}(i) + \text{proc}_{BS}(i) + \text{que}_{BS}(i) + \text{trans}_{BS}(i) + \text{prop}_{BS\text{-}MS}(i)$$

Among the delays 207-211, only the queuing 209 and the transmission delays 210 at the BS 204 are significant. This is because typical distances between ASN GW 202 to BS 204, and from BS 204 to MS 206 are such that propagation times are typically sub-millisecond. In addition, the processing time at the BS 204 is typically sub-millisecond. On the other hand, the average queuing delay 209 at the BS 204 is of the order of IEEE 802.16 frame duration, which typically has an average queuing delay of milliseconds. As such, the estimated arrival time $\text{arr}_{MS}(i)$ 213 of $i^{th}$ packet of a flow at the MS 206 becomes:

$$\text{arr}_{MS}(i) \approx \text{dep}_{mon}(i) + \text{que}_{BS}(i) + \text{trans}_{BS}(i)$$

In order to estimate the transmission time of a packet at the BS 204, embodiments of the invention track the BS 204 to MS 206 downlink or service flow rate B(i) obtained by this service flow when packet i is transmitted by the BS 204. In addition, embodiments of the invention provide methods for estimating B(i), as described below. Given the rate, $\text{trans}_{BS}(i)$ 210 can be estimated as size(i)/B(i). In addition, assuming that the BS 204 services the packets of a flow in a First-Come-First-Serve (FCFS) basis, $\text{que}_{BS}(i)$ 209 is either (1) the difference between the departure time of packets i−1 at the BS 204 and the arrival time of packet i at the BS 204 (which if we ignore the propagation and processing time, is the difference between arrival time of packet i−1 at the MS 206 and the departure time of packet i from the monitor 203), or (2) it is 0 (zero) if packet i−1 is completely transmitted by the BS 204 before packet i arrives at the BS 204. Three main assumptions for this estimation are: (1) the BS 204 services the packets of a flow on a FCFS basis; (2) B(i) obtained by service flow does not vary during the transmission of an RTP packet, and (3) the propagation delays 207, 209-211 and the processing time 208 at the BS 204 are negligible. Thus, according to embodiments of the invention, the estimated packet arrival time can be rewritten as the following recurrence relation:

$$\text{arr}_{MS}(0) \approx \text{dep}_{mon}(0) + \text{size}(0)/B(0), \text{ and}$$

$$\text{arr}_{MS}(i) \approx \text{dep}_{mon}(i) + \max\{0, \text{arr}_{MS}(i-1) - \text{dep}_{mon}(i)\} + \text{size}(i)/B(i), \text{ when } i > 0$$

As mentioned above, the downlink or service flow rate B(i) can be estimated. Again, a WiMAX network will be used as a non-limiting example. The downlink rate obtained by a service flow in a WiMAX network depends on multiple factors, including signal strength at the MS and its variation with time, the scheduling algorithm at the BS, and the negotiated QoS parameters for that service flow. Embodiments of the invention provide conservative estimation of the service flow rate, which gives an upper bound on the arrival time of a packet. In addition, embodiments of the invention estimate the service flow rate from certain RRM and DPC messages exchanged between the ASN GW and a BS.

According to embodiments of the invention, DPC messages may include Path Registration Request/Response/Ack and Path Modification Request/Response/Ack. In addition, embodiments of the invention provide that during activation or modification of a service flow for an MS, the QoS parameters for the service flow are negotiated among the MS, the BS to which the MS is connected, and the serving ASN GW. Furthermore, the QoS negotiation between the BS and the ASN GW may be performed using the NWG DPC messages. The QoS parameters for all real-time scheduling services include Minimum Reserved Traffic Rate (MRTR) requested for the service flow. Moreover, the BS must ensure that at least MRTR is guaranteed for the service flow averaged over a long period.

Embodiments of the invention may utilize the RRM Messages PHY Param Report Request/Report and Spare Capacity Request/Report. According to certain embodiments of the invention, the ASN GW may request periodic RRM messages that provide information about the channel quality. In addition, the DL PHY Serving Level (DL PSL) value included in the RRM message PHY Param Report provides the channel rate for the MS (in bits/Hz). However, the channel rate alone does not determine the rate obtained by the service flow. It also depends on the amount of radio resources, or slots, are allocated to the service flow in each frame of the 802.16 transmission. The RRM message Spare Capacity Report contains the value Average Radio Resource DL (ARRD) which indicates the ratio of non-assigned radio resource to total usable radio resource in the DL, such as the fraction of radio resource that are free in the DL subframe. If ARRD is higher than a predefined constant Λ, then according to embodiments of the invention, it may be assumes that the MRTR for the service flow is ensured even if the DL PSL decreases.

The QoS parameters for all real-time scheduling services in 802.16 includes a Maximum Latency (ML) parameters, which is the maximum allowed time interval between when a packet is received at a BS MAC and the time when the packet is delivered by the MS MAC. According to embodiments of the invention, it is assumed that the processing and propagation delays are negligible, ML is an upper bound on the packet delay (monitor to MS) that is being estimated. However, embodiments of the invention provide that the BS is required to guarantee ML only if the average arrival rate of the service flow is below MRTR. In addition, the BS might not be able to guarantee ML if the channel quality for the MS goes down or if the BS is overloaded. In these cases, the BS will eventually renegotiate the QoS parameters (including ML) for the service flow.

Embodiments of the invention further provide implementations of overall arrival time estimation. In addition, aspects of the invention may assume one or more of the following tunable constants: (1) ARRD bound Λ, (2) overloading factor when BS is overloaded Γ (for instance, Γ can be set to ARRD/Λ), (3) Initial DL PSL $P_I$ for the MS when the QoS parameters were (re-)negotiated and (4) averaging window L. Furthermore, when a packet i departs the monitor, embodiments of the invention use the current estimate of the rate as an estimate of B(i), although packet i is transmitted later. As such, embodiments of the invention may assume that the service flow rate does not change significantly between the departure time of a packet from the monitor and from the BS.

According to embodiments of the invention, the estimation B(i) is based on ARRD, PSL, MRTR and $P_I$. In addition, the values of MRTR and $P_I$ for the service flow may be updated whenever the QoS parameters for the flow are (re-)negotiated.

However, embodiments of the invention provide that the current PSL and ARRD values may be updated whenever a new RRM message is received.

Figure 3:
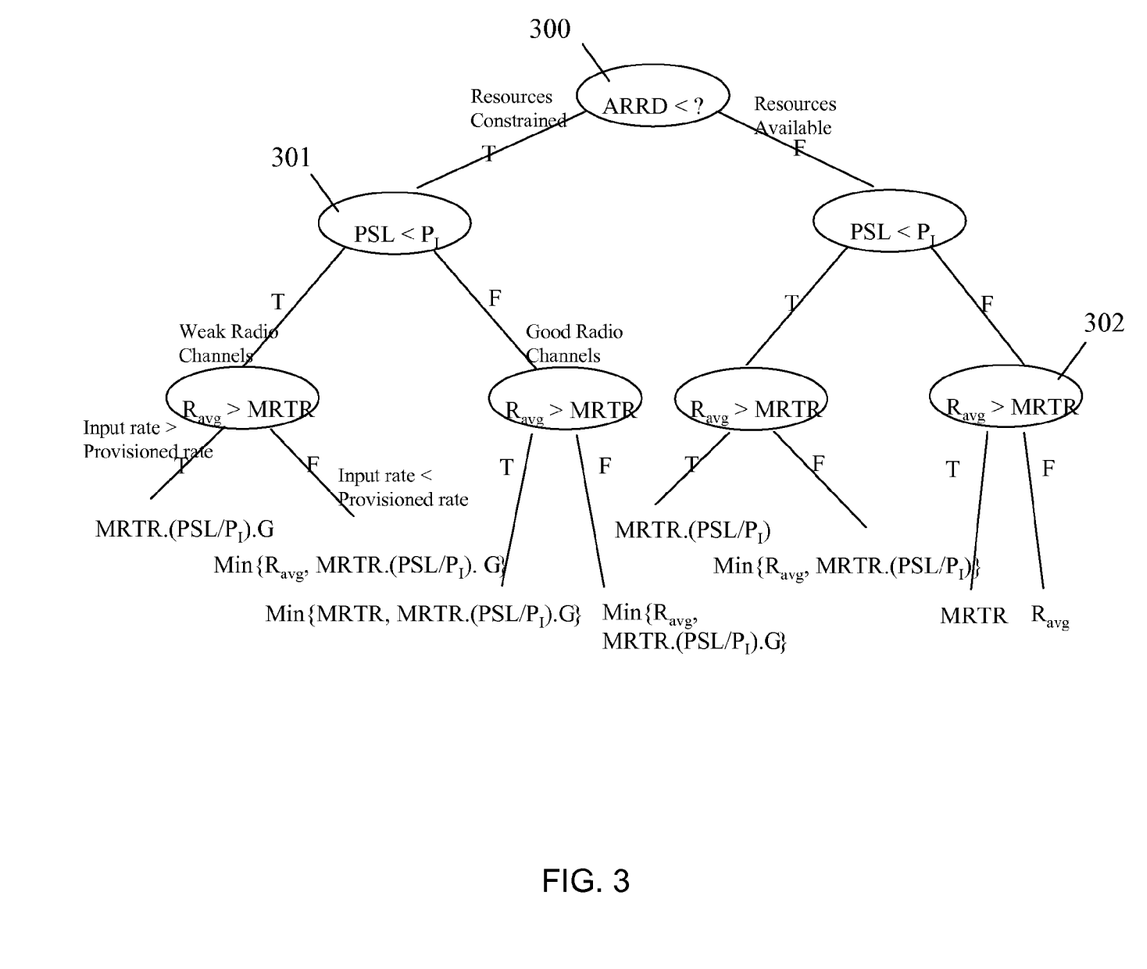
FIG. 3 illustrates in decision diagram form an embodiment of the invention.

Referring now to FIG. 3, there is depicted a decision diagram illustrating embodiments of the invention utilizing a method to estimate B(i). In the service flow rate estimation, certain conditions are checked 300-308, such as: (1) whether the BS is overloaded (ARRD<Λ) 300; (2) whether the PSL of the concerned MS has decreased (PSL<$P_I$) 301; (3) and whether the current service flow rate is higher than the reserved rate ($R_{avg}$>MRTR) 302. Embodiments of the invention provide that certain values depicted in FIG. 3 are known and assumed values, such as $P_I$ (initial PSL during session setup), $R_{avg}$ (average rate of input stream), or desired ARRD bound. Furthermore, according to embodiments of the invention, the estimated flow rate may depend on the provisioned rate, the available radio resource, and the radio resource quality, while the estimated rate in the BS may be used to estimate delay.

According to certain embodiments of the invention, if any of the three conditions are true, the estimated rate may be reduced. In addition, embodiments of the invention provide that if the BS is overloaded, then the estimated rate may be reduced by the overloading factor Γ. Furthermore, aspects of the invention provide that if the PSL decreases, then the estimated rate may be scaled down by the ratio of the current PSL to the initial PSL. Moreover, embodiments of the invention provide that if the current rate is higher than the reserved rate, it may be brought down to the reserved rate.

According to embodiments of the invention, upon departure of the $i^{th}$ RTP packet at the monitor at time $dep_{mon}(i)$.

1. Average flow rate $R_{avg}$=Sum of sizes of packets i−L+1 to i/($dep_{mon}(i)$−$dep_{mon}(i-L+1)$)).
2. B(i) is updated according to the following diagram.
3. If (i==0) then $arr_{MS}(0)$ $dep_{mon}(0)$+size(0)/B(0).
4. Else: $arr_{MS}(i) \approx dep_{mon}(i)$+max{0, $arr_{MS}(i-1)$−$dep_{mon}(i)$}+size(i)/B(i)

In addition, embodiments of the invention provide that upon receiving a DPC Path Registration/Modification Response message for a flow, the MRTR of this flow equals the MRTR contained in the message. Furthermore, embodiments of the invention provide that upon receiving an RRM Spare Capacity Report message from the BS associated with this flow, the ARRD for the flow equals the ARRD in the message. Moreover, embodiments of the invention provide that upon receiving an RRM PHY Param Report message for the BS and MS associated with the flow, the PSL for the flow is updated to equal BS-MS DL PSL in the message, and if this is the first RRM message after a DPC Path Registration/Modification Response message, then update $P_I$ of this flow to equal PSL for this flow. According to at least one embodiment of the invention, the tunable parameters can be set based on initial measurements on the associated BS, or the BS specifications, before the monitoring system is deployed.

Embodiments of the invention provide that the BS is a black box to the monitor. As such, the scheduler and resource allocation algorithms are not known and estimation assumes a conservative scheduling. In addition, according to embodiments of the invention, provisioned QoS parameters for a service are known, such as the minimum MRTR. As such, as depicted in FIG. 3, if the input rate is high, embodiments of the invention may increase the provisioned rate as per the radio resource availability and channel quality. Furthermore, as depicted in FIG. 3, if the input rate is low, embodiments of the invention may work to satisfy the provisional rate.

Figure 4:
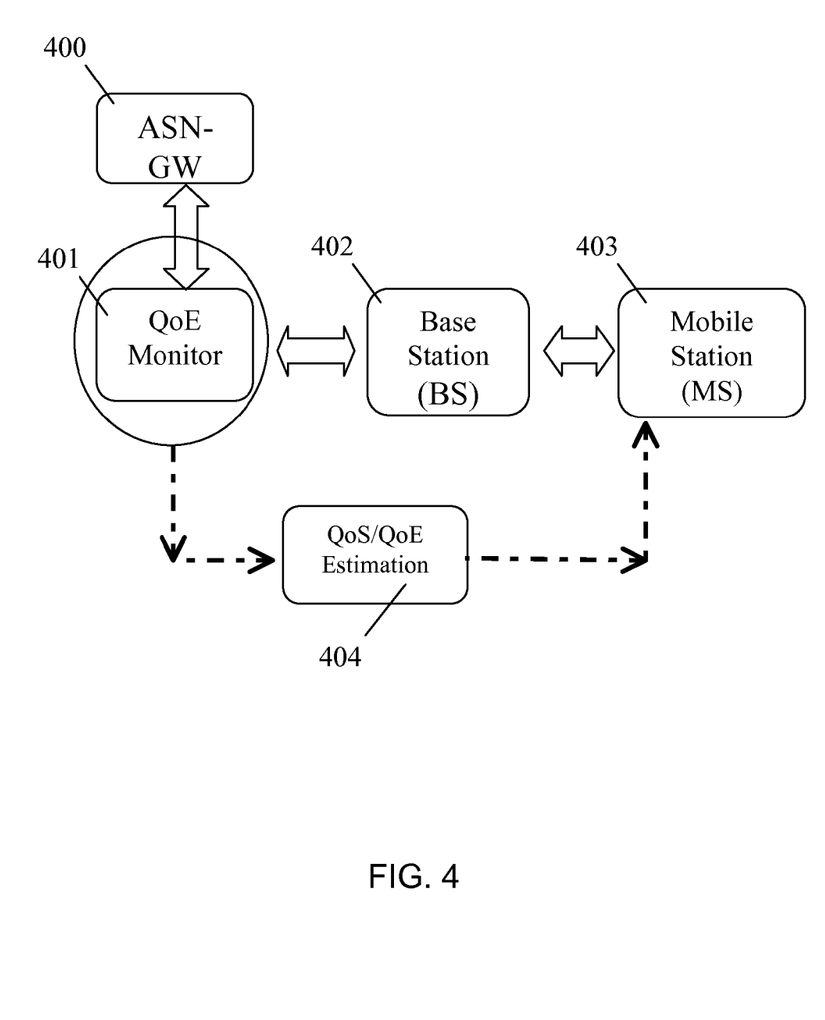
FIG. 4 illustrates in block diagram form an exemplary high-level depiction of a wireless communications network according to an embodiment of the invention.

Referring now to FIG. 4, there is depicted a block diagram of a high-level depiction of an embodiment of the invention.

As shown in FIG. 4, embodiments of the invention may remotely monitor 401 packets sent from a ASN GW 400, and essentially monitor the QoE of a MS 403 in communication with a BS 402 through the estimation of QoS/QoE metrics 404. As such, FIG. 4 shows an embodiment of the invention providing remote QoE monitoring and estimation methods and systems which are capable and deployable without additional support or feedback from a MS 403.

Accordingly, embodiments of the invention broadly contemplate systems and methods to compute QoE. According to an embodiment of the invention, continuous QoE monitoring is obtained through the utilization of packet loss statistics. According to an embodiment of the invention, the packet arrival time estimation discussed above can be used with various Real-Time Multimedia QoE estimation techniques. Embodiments of the invention assume that the RTP-based real-time application where packets that have end-to-end delay that is higher than a threshold Δ are discarded (where Δ is specified in advance). In addition, embodiments of the invention also ignore the clock skew and drift between the sender, monitor and the MS. Furthermore, standard techniques are used by the RTP receivers to obtain transmission time of the packet from RTP timestamp in the packet. As a non-limiting example, transmission time may be based on the NTP timestamp in the last received send report in the RTCP packet to obtain the time send(i) when an RTP packet i is sent. Moreover, embodiments of the invention provide that if the estimated arrival time at the MS $arr_{MS}(i)$>send(i)+Δ, then the packet is considered to have been discarded.

Packets might not be received at the monitor, among other reasons, because they are lost in the network between the source and the monitor. Embodiments of the invention estimate the number of these packets. As a non-limiting example, consider an average packet interval P, wherein F is the offset between the packet number and the sequence number in the RTP stream. For every packet kP, k=1, 2, ... n, any packets with sequence number between (kP-F) and (kP-P-F+1) that is not received by the monitor by time send(kP)+Δ is considered missing. Embodiments of the invention provide that a packet is lost if it is either missing or discarded.

Embodiments of the invention provide continuous quality monitoring of the received flow by evaluating QoE for each time epoch. In addition, embodiments of the invention proposes utilization of certain QoE metrics, which are the weighted sum of certain other estimated metrics. Furthermore, the weights of the sums can be tuned for different applications when the monitoring system is deployed. According to embodiments of the invention, the QoE metrics are: (1) Packet jitter: Calculated for each time epoch, based on the arrival time estimate $arr_{MS}(i)$; (2) Packet loss rate: Calculated as the fraction of packets lost in each epoch; (3) Packet end-to-end latency: $arr_{MS}(i)$−send(i); and (4) obtained service flow rate B(i).

According to embodiments of the invention, monitored QoE data, among other options, may be stored or transmitted, such as to a service provider. In addition, embodiments of the invention provide for various levels of monitoring. As non-limiting examples, one possible level involves the monitoring of the QoE of a user, while another possible level involves viewing the QoE statistics of one or more sessions after the one or more sessions have completed.

Figure 5:
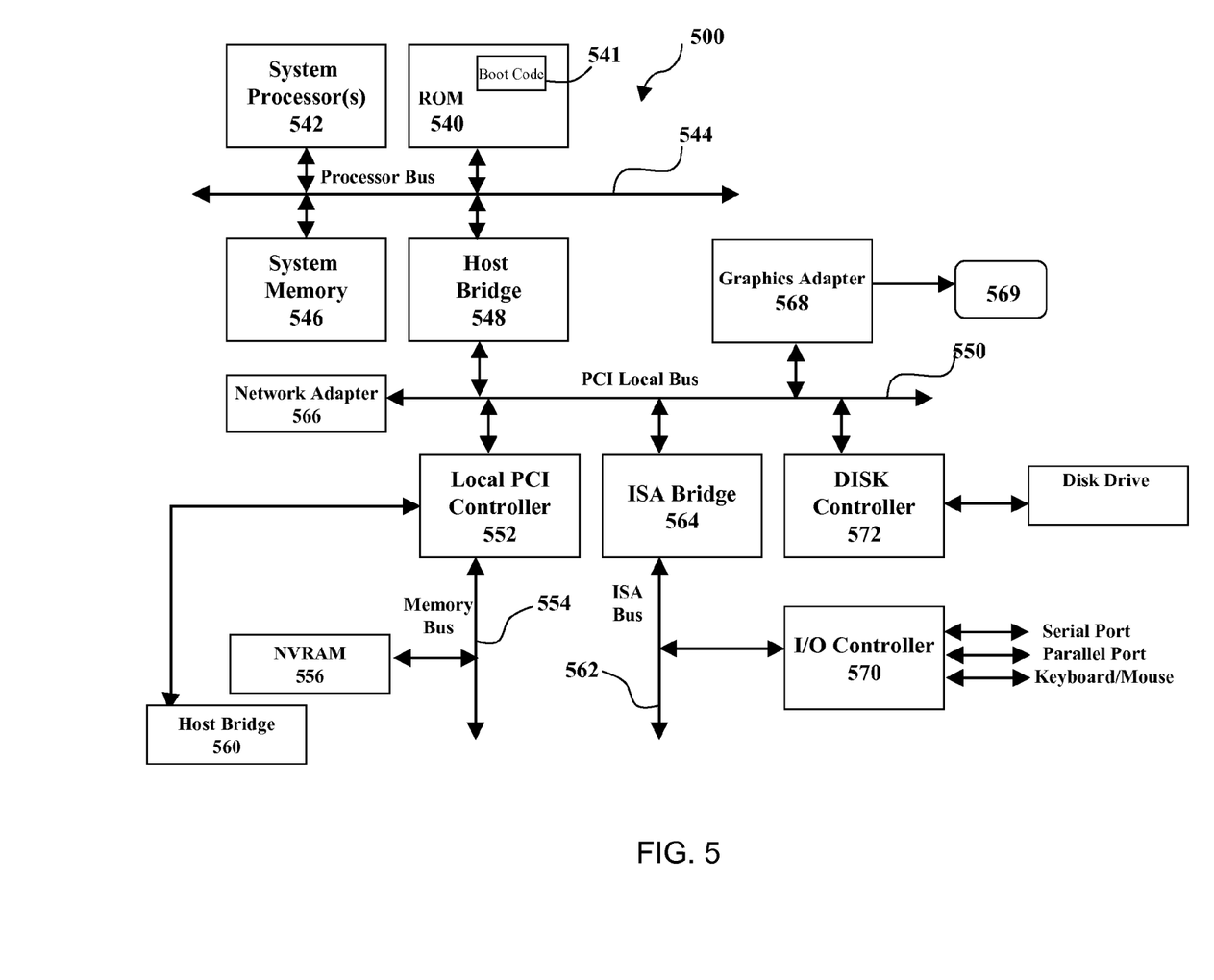
FIG. 5 illustrates a computer system according to an embodiment of the invention.

Referring now to FIG. 5, there is depicted a block diagram of an illustrative embodiment of a computer system 500. As is apparent from the description, however, the embodiments of the invention may be implemented in any appropriately configured device, as described herein.

Those having ordinary skill in the art will readily understand that embodiments of the invention may be implemented using one or more computer systems. In this regard, a non-limiting and exemplary computer system is described herein.

As shown in FIG. 5, computer system 500 includes at least one system processor 542, which is coupled to a Read-Only Memory (ROM) 540 and a system memory 546 by a processor bus 544. System processor 542, which may comprise one of the AMD line of processors produced by AMD Corporation or a processor produced by INTEL Corporation, is a general-purpose processor that executes boot code 541 stored within ROM 540 at power-on and thereafter processes data under the control of an operating system and application software stored in system memory 546. System processor 542 is coupled via processor bus 544 and host bridge 548 to Peripheral Component Interconnect (PCI) local bus 550.

PCI local bus 550 supports the attachment of a number of devices, including adapters and bridges. Among these devices is network adapter 566, which interfaces computer system 500 to LAN, and graphics adapter 568, which interfaces computer system 500 to display 569. Communication on PCI local bus 550 is governed by local PCI controller 552, which is in turn coupled to non-volatile random access memory (NVRAM) 556 via memory bus 554. Local PCI controller 552 can be coupled to additional buses and devices via a second host bridge 560.

Computer system 500 further includes Industry Standard Architecture (ISA) bus 562, which is coupled to PCI local bus 550 by ISA bridge 564. Coupled to ISA bus 562 is an input/output (I/O) controller 570, which controls communication between computer system 500 and attached peripheral devices such as a as a keyboard, mouse, serial and parallel ports, et cetera. A disk controller 572 connects a disk drive with PCI local bus 550. The USB Bus and USB Controller (not shown) are part of the Local PCI controller (552).

It should be noted as well that aspects of the invention may be embodied as a system, method, or apparatus. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of an apparatus embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method, comprising:
    ascertaining at one or more monitors one or more wireless network characteristics selected from the group consisting of:
        control messages of a wireless network;
        one or more base station delay factors;
        packet information from one or more packets transmitted over the wireless network; and
        packet statistics;
    calculating quality of experience metrics at the one or more monitors using the one or more wireless network characteristics;
    said calculating of quality of experience metrics at the one or more monitors further comprising utilizing a weighted sum of the packet statistics;
    said ascertaining comprising passively ascertaining the one or more wireless network characteristics; and
        said calculating comprising using solely the one or more ascertained wireless network characteristics.

2. The method of claim 1, wherein calculating quality of experience metrics at the one or more monitors further comprises utilizing the packet statistics and the control messages.

3. The method of claim 1, further comprising:
    estimating at the one or more monitors a packet arrival time for the one or more packets to arrive at a mobile station based on the packet information and the one or more base station delay factors;
    wherein calculating quality of experience metrics at the one or more monitors further comprises utilizing the packet arrival time, the packet information, and the control messages.

4. The method of claim 1, wherein the base station delay factors comprise one or more of:
    a monitor to base station propagation delay;
    a base station processing delay;
    a base station queuing delay;
    a base station transmission delay; and
    a base station to mobile station propagation delay.

5. The method of claim 1, wherein the packet information comprises one or more of:
    a times tamp packet header field; and
    a sequence number packet header field.

6. The method of claim 5, wherein the packet information further comprises packet size information.

7. The method of claim 1, wherein the control messages comprise one or more of:
    a minimum reserved traffic rate message;
    a downlink physical service level message; and
    an available radio resource in downlink message.

8. The method of claim 7, wherein a base station estimated data flow rate is estimated at the one or more monitors utilizing the minimum reserved traffic rate message, the downlink physical service level message, and the available radio resource in downlink message.

9. The method of claim 1, wherein the packet statistics comprise one or more of:
    a packet jitter value;
    a packet loss rate;
    an average end-to-end packet delay; and
    a service flow rate.

10. A system comprising:
    one or more processors; and
    a computer readable storage medium having computer readable program code embodied therewith, the computer readable program code being executable by the processor and comprising:
    computer readable program code configured to ascertain one or more wireless network characteristics selected from the group consisting of:
        control messages of a wireless network;
        one or more base station delay factors;
        packet information from one or more packets transmitted over the wireless network; and
        packet statistics;
    computer readable program code configured to calculate quality of experience metrics using the one or more wireless network characteristics and via utilizing a weighted sum of the packet statistics;
    said computer readable program code being configured to passively ascertain the one or more wireless network characteristics; and
    said computer readable program code being configured to calculate quality of experience metrics at the one or more monitors via using solely the one or more ascertained wireless network characteristics.

11. The system according to claim 10, wherein the computer readable program code configured to calculate quality of experience metrics is further configured to utilizing the packet statistics and the control messages to calculate quality of experience metrics.

12. The system according to claim 10, wherein the computer readable program code further comprises computer readable program code configured to estimate a packet arrival time for the one or more packets to arrive at a mobile station based on the packet information and the one or more base station delay factors;
    wherein the computer readable program code configured to calculate quality of experience metrics is further configured to utilize the packet arrival time, the packet information, and the control messages to calculate quality of experience metrics.

13. The system according to claim 10, wherein the base station delay factors comprise one or more of:
    a monitor to base station propagation delay;
    a base station processing delay;
    a base station queuing delay;
    a base station transmission delay; and
    a base station to mobile station propagation delay.

14. The system according to claim 10, wherein the packet information comprises one or more of:
    a timestamp packet header field; and
    a sequence number packet header field.

15. The system according to claim 14, wherein the packet information further comprises packet size information.

16. The system according to claim 10, wherein the control messages comprise one or more of:
    a minimum reserved traffic rate message;
    a downlink physical service level message; and
    an available radio resource in downlink message.

17. The system according to claim 16, wherein the computer readable program code further comprises computer readable program code configured to estimate a base station data flow rate utilizing the minimum reserved traffic rate message, the downlink physical service level message, and the available radio resource in downlink message.

18. The system according to claim 10, the computer readable program code configured to calculate quality of experience metrics is further configured to utilize a weighted sum of the packet statistics.

19. A computer program product comprising:
a non-transitory computer readable storage medium having computer readable program code embodied therewith, the computer readable program code comprising:
computer readable program code configured to ascertain one more wireless network characteristics selected from the group consisting of:
control messages of a wireless network;
one or more base station delay factors;
packet information from one or more packets transmitted over the wireless network; and
packet statistics;
computer readable program code configured to calculate quality of experience metrics using the one or more wireless network characteristics;
computer readable program ode configured to calculate quality of experience metrics using the one or more wireless network characteristics and via utilizing a weighted sum of the packet statistics;
said computer readable program code being configured to passively ascertain the one or more wireless network characteristics; and
said computer readable program code being configured to calculate quality of experience metrics at the one or more monitors via using solely the one or more ascertained wireless network characteristics.

* * * * *